(12) United States Patent
Broomhall et al.

(10) Patent No.: US 10,282,049 B2
(45) Date of Patent: May 7, 2019

(54) DISPLAY SCREEN MANAGEMENT SYSTEM, METHOD AND COMPUTER PROGRAM PRODUCT

(71) Applicant: International Business Machines Corporation, Armonk, NY (US)

(72) Inventors: Matthew E. Broomhall, Goffstown, NH (US); Fabrizio N. Caldas, Sumare (BR); Christopher R. Dotson, Lexington, KY (US); Michael R. Spano, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 14/794,087

(22) Filed: Jul. 8, 2015

(65) Prior Publication Data

US 2017/0010757 A1 Jan. 12, 2017

(51) Int. Cl.
*G06F 3/0481* (2013.01)
*G06F 3/048* (2013.01)

(52) U.S. Cl.
CPC .................. *G06F 3/048* (2013.01)

(58) Field of Classification Search
CPC .................................................. G06F 3/0481
See application file for complete search history.

(56) References Cited

U.S. PATENT DOCUMENTS

| 5,499,334 | A | * | 3/1996 | Staab | G06F 3/0481 |
| | | | | | 715/778 |
| 7,478,326 | B2 | | 1/2009 | Holecek et al. | |
| 7,552,397 | B2 | | 6/2009 | Holecek et al. | |
| 7,581,192 | B2 | | 8/2009 | Stabb et al. | |
| 2005/0223334 | A1 | | 10/2005 | Guido et al. | |
| 2006/0161860 | A1 | * | 7/2006 | Holecek | G06F 3/048 |
| | | | | | 715/781 |
| 2009/0083655 | A1 | * | 3/2009 | Beharie | G06F 3/0481 |
| | | | | | 715/781 |
| 2016/0077685 | A1 | * | 3/2016 | Fang | G06F 9/452 |
| | | | | | 715/778 |

OTHER PUBLICATIONS

Wiygul, "Unlock your homescreen with Nova Launcher (Monday Makeover)", published: Feb. 9, 2015, androidguys.com, http://www.androidguys.com/2015/02/09/unlock-your-homescreen-with-nova-launcher-monday-makeover/ (Year: 2015).*

(Continued)

*Primary Examiner* — Amy Ng
*Assistant Examiner* — Seth A Silverman
(74) *Attorney, Agent, or Firm* — Scully, Scott, Murphy & Presser, P.C.; Kurt P. Goudy, Esq.

(57) ABSTRACT

Provided are graphical user interface "baskets" that hold collections of windows on a large display (or collection (or array) of small displays) and confine respective windows into a particular screen region (that is, basket) as if that screen region (that is, basket) were the entire display. In one example, the basket layout(s) and window layout(s) may be saved. In another example, multiple windows may be organized/managed such that a "maximize" of a window does not take up the entire large display.

20 Claims, 6 Drawing Sheets

(56) References Cited

OTHER PUBLICATIONS

Superuser, "Can I run multiple virtual machines at once?", published: Apr. 29, 2013, Superuser.com, https://superuser.com/questions/589265/can-i-run multiple-virtual-machines-at-once (Year: 2013).*

Toastytech, "Windows 3.1", available: Feb. 27, 2012, (earliest: Jun. 8, 2002), http://toastytech.com/guis/win31.html,https://web.archive.org/web/20120227101756/http://toastytech.com/guis/win31.html (Year: 2012).*

Hutchings, D.R., et al., "New Operations for Display Space Management and Window Management", Technical Report GIT-GVU-02-18, (Aug. 2002), 20 pages.

International Business Machines, "Grouping desktop windows", ip.com, (Oct. 15, 2004), 2 pages.

* cited by examiner

DISPLAY SCREEN MANAGEMENT SYSTEM, METHOD AND COMPUTER PROGRAM PRODUCT

BACKGROUND

The present disclosure relates generally to the field of display screen management. In one specific example, the present disclosure relates to the field of very large (e.g., desk size) display screen management. In various embodiments, systems, methods and computer program products are provided.

As displays get larger, organizing the information on those screens for work will become more difficult, particularly when whole-desk displays are considered that are many square feet in area. Existing solutions, such as virtual desktop switching, often do not make good use of this much screen real estate (and hide some of the information where it cannot be seen at all) when a large display would have space to display it.

SUMMARY

The present disclosure provides for window "baskets" that hold collections of different windows on a large display (or collection of small displays) and confine respective windows into a particular screen region (that is, basket) as if that screen region (that is, basket) were the entire display.

In one embodiment, certain window(s) may be tagged (for example) as instant messages or presentation materials, and such windows would always show up in their basket when opened—wherein the respective applications treat that region as if it were the entire screen. A user could move the entire basket around as a person would a real basket on his or her desk, to make it easier to keep things organized. A user could also control the display to resize the basket to see more of what is in the basket, or temporarily spread out the contents of the basket across the entire desktop and then put the windows back in the basket when finished focusing on that basket's content.

In another example, using tags, a particular window could fall into more than one basket (e.g., so an open window displaying a lawsuit document for Client A could appear in both the "Active lawsuits" basket and the "Client A" basket). In addition to already opened windows, baskets could also contain links to documents that could be opened either automatically or manually when the basket is accessed. In another example, a basket could contain therein a windowless application.

In one embodiment, a computer-implemented method for management of a display is provided, the method comprising: receiving, by a processor, an indication from a user of a first location on the display for a first basket associated with at least a first window; receiving, by the processor, an indication from the user of a second location on the display for a second basket associated with at least a second window; limiting, by the processor, a size of the first basket to be smaller than a size of a display area of the display; limiting, by the processor, a size of the second basket to be smaller than the size of the display area of the display; displaying, by the processor, the first window in the first basket, wherein the size of the first window is limited to the size of the first basket such that the first window is incapable of being made to fill the entire display area of the display; and displaying, by the processor, the second window in the second basket, wherein the size of the second window is limited to the size of the second basket such that the second window is incapable of being made to fill the entire display area of the display.

In another embodiment, a computer readable storage medium, tangibly embodying a program of instructions executable by the computer for management of a display is provided, the program of instructions, when executing, performing the following steps: receiving an indication from a user of a first location on the display for a first basket associated with at least a first window; receiving an indication from the user of a second location on the display for a second basket associated with at least a second window; limiting a size of the first basket to be smaller than a size of a display area of the display; limiting a size of the second basket to be smaller than the size of the display area of the display; displaying the first window in the first basket, wherein the size of the first window is limited to the size of the first basket such that the first window is incapable of being made to fill the entire display area of the display; and displaying the second window in the second basket, wherein the size of the second window is limited to the size of the second basket such that the second window is incapable of being made to fill the entire display area of the display.

In another embodiment, a computer-implemented system for management of a display is provided, the system comprising: a processor; and an instruction memory storing computer readable instructions that, when executed by the processor, implement: a receiving element configured to receive: (a) an indication from a user of a first location on the display for a first basket associated with at least a first window; and (b) an indication from the user of a second location on the display for a second basket associated with at least a second window; a limiting element configured to limit: (a) a size of the first basket to be smaller than a size of a display area of the display; and (b) a size of the second basket to be smaller than the size of the display area of the display; a displaying element configured to display: (a) the first window in the first basket, wherein the size of the first window is limited to the size of the first basket such that the first window is incapable of being made to fill the entire display area of the display; and (b) the second window in the second basket, wherein the size of the second window is limited to the size of the second basket such that the second window is incapable of being made to fill the entire display area of the display.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

In one example, one or more systems may provide for display screen management. In another example, one or more methods may provide for display screen management. In another example, one or more algorithms may provide for display screen management.

For the purposes of this disclosure the term "window" is intended to refer to a graphical user interface portion of a computer application (e.g., software program).

For the purposes of this disclosure the term "basket" is intended to refer to an area on a display screen for displaying one or more windows.

Reference will now be made to an example scenario applicable to the present disclosure. In this regard, reference is now made to the example display screen layout of FIG. 1. As seen, the user has a very large (e.g., multi-touch) display 101 (or a collection (or array) of smaller displays (not shown) used as a large virtual "desktop"). The user manually designates (e.g., using a mouse or track ball) different regions of the large desktop as baskets 103A ("e.g., "Client 'A' Basket"), 103B (e.g., "Client 'B' Basket"), 103C ("Social Basket"). In one specific example, instant message windows may be tagged (discussed in more detail below) to appear in the "Social Basket" by default (see arrow C of FIG. 1). In addition, in this example, there is a default basket 103D ("Regular Desktop Basket"). New, untagged windows may appear in the "Regular Desktop Basket" by default (see arrow B of FIG. 1). Each window 105A-105L treats its respective basket area as the whole desktop for that window.

Figure 1:
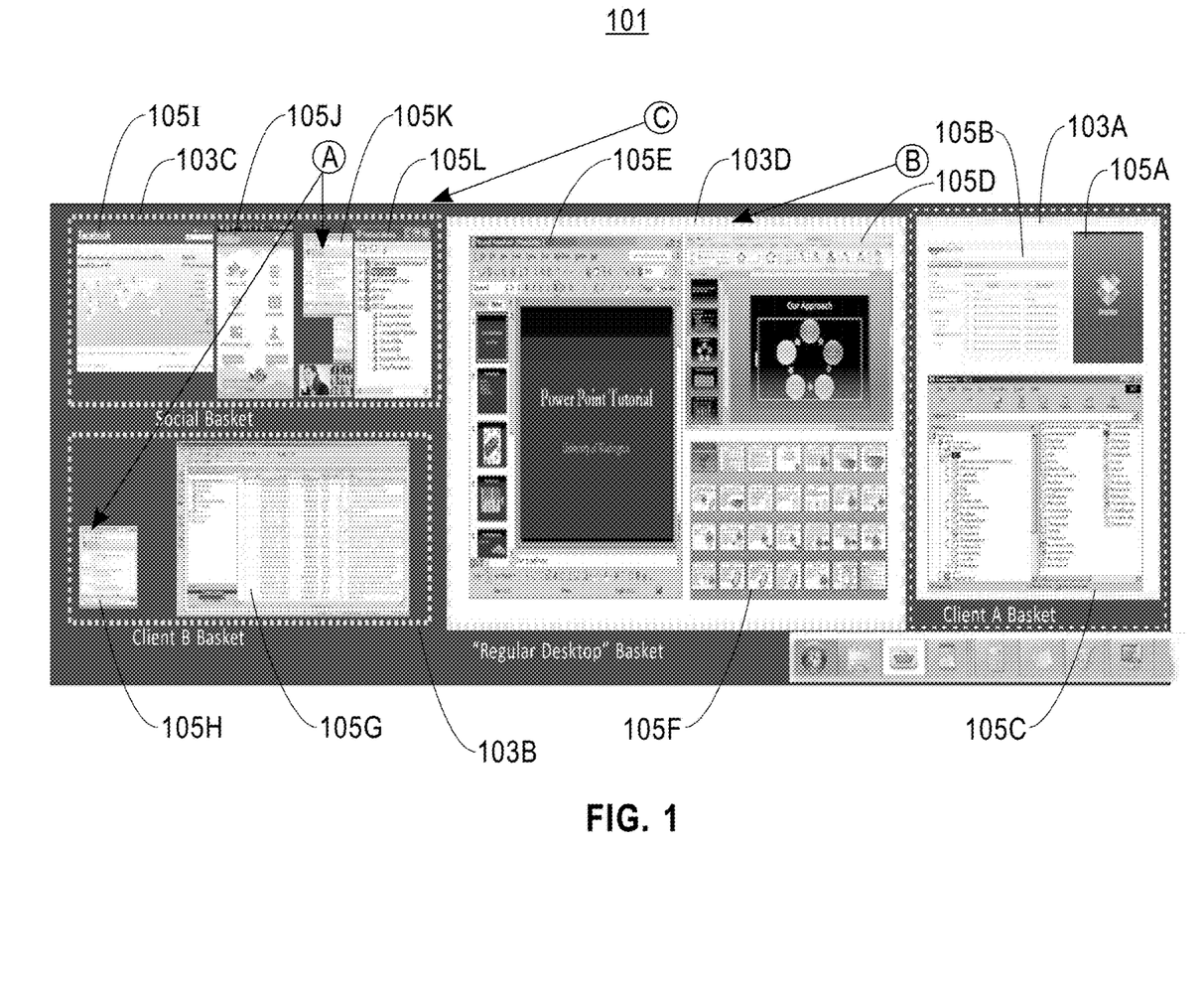
FIG. 1 depicts a diagram showing an example display screen layout according to an embodiment.

Various windows may be assigned to different baskets (these groupings are remembered) and a window may be mirrored into more than one basket for organizational purposes such that the same window would be displayed in both places (see, e.g., arrows "A" of FIG. 1 showing the same window (called out as 105H and 105K) in each of the "Client 'B' Basket" 103B and the "Social Basket" 103C). In another example, the user may right-click on the title bar of an open document and choose to place this document for display into both an "Active lawsuits" basket (not shown) and a "Client 'C' basket (not shown).

File shortcuts may also be added to baskets, so that a file opens into a respective window when the respective basket is accessed. Further, each of the baskets may be moved and/or resized. The user may also choose to temporarily "dump out" a basket, displaying everything in such a basket across the whole desktop for a moment while arranging the windows, and then pile the windows back into the basket. Further, a basket may be hidden and/or covered by other basket(s). In addition, the user may also delete and/or empty out a basket, either manually or on schedule—for example, when the user is done with "current fiscal year" windows but wants to keep the basket. Moreover, when a basket is placed on the desktop, files and other windows may be automatically opened and ready for use.

There will typically be no need to switch between virtual desktops, as the display is expected to be large enough to display many items at once. However, the user might pull certain baskets close or push them further away depending on what the current work focus is, but the baskets can all be displayed at the same time. However, if desired for more complete separation, the user could still make use of multiple virtual desktops, each of which would contain different baskets and windows (such as, for example, a "personal" desktop and a "work" desktop).

Reference will now be made to an example process for display screen management. In this example, the user first opens an application with no previous basket settings and the system places the application's window(s) into, for example, the "Regular Desktop" basket, which is a user-defined region of the large display. The user then defines another region as a basket (for example, by clicking "define basket" and dragging a rubber-band region of the desktop). The system then puts the newly defined basket into a table in memory and opens a basket that can hold windows. Next, the user right-clicks to select a given window and chooses to put the given window in one or more baskets. The system then moves that given window inside the chosen basket(s), and this setting is remembered; the next time that the given window opens, this given window will appear in all of the basket(s) in which the given window had been placed. If a window is placed into more than one basket, the system shows an identical copy of that window in each basket—similar to displaying the same window on two monitors simultaneously.

Still referring to this example process for display screen management, the user may tag all window(s) meeting various criteria (e.g., with respect to the application that opened the window, the window title, the window contents, etc.) for display in selected basket(s). The system then moves all current occurrences of those window(s) to the selected basket(s), and the system automatically places any new window(s) matching that criteria into the correct basket(s).

Further, a user may place a file shortcut into a basket. In this case, the basket opens the file pointed to by the shortcut, and subsequently opens that file every time the basket is placed onto the desktop. In addition, the user may move and/or resize a basket. In one example, the system treats the baskets like regular windows which may overlap, be moved, be resized, etc. The system may place notifications on the edges of the baskets to indicate that windows are out of sight (for example, if a basket has been resized small enough so that some windows are not fully visible inside the basket).

Still referring to this example process for display screen management, the user may right-click a basket and choose to "dump out". In this example, the system then arranges the windows in the basket across the entire desktop (obscuring all other baskets temporarily) for the user to use. The user then right-clicks the desktop and chooses to "gather up" the basket contents, and the system rearranges the windows to fit back into the basket. Moreover, a user may right-click a basket and choose to delete the basket or clear it out. In this example, the system closes all windows inside the basket as if the user had individually closed such windows. If delete is selected, the system then removes the basket(s) from the desktop and memory table. In addition, a user may right-click a basket and choose a "Tile" option. In this case, windows in that basket are tiled inside the basket as if the basket were the entire desktop.

Figure 2:
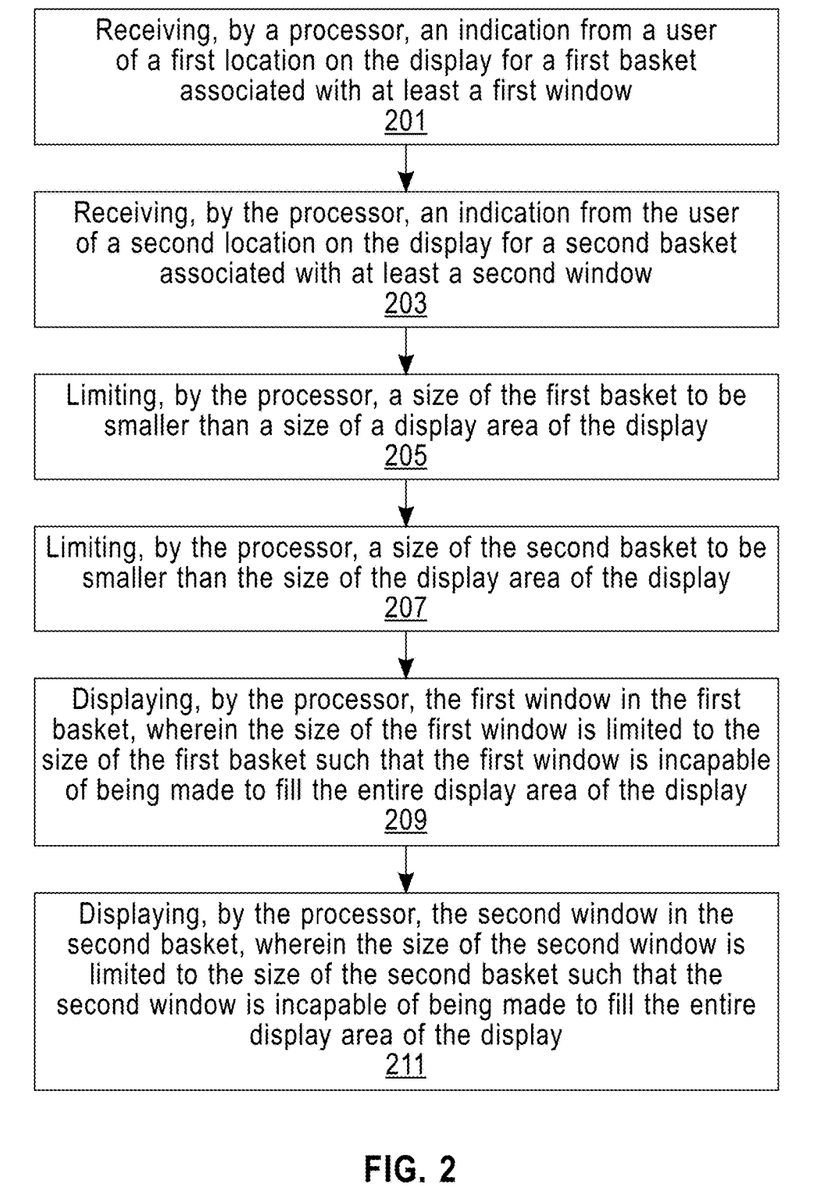
FIG. 2 depicts a flowchart of a method according to an embodiment.

Referring now to FIG. 2, a method for management of a display is shown. As seen in this FIG. 2, the method of this embodiment comprises: at 201—receiving, by a processor, an indication from a user of a first location on the display for a first basket associated with at least a first window; at 203—receiving, by the processor, an indication from the user of a second location on the display for a second basket associated with at least a second window; at 205—limiting, by the processor, a size of the first basket to be smaller than a size of a display area of the display; at 207—limiting, by the processor, a size of the second basket to be smaller than the size of the display area of the display; at 209—displaying, by the processor, the first window in the first basket, wherein the size of the first window is limited to the size of the first basket such that the first window is incapable of being made to fill the entire display area of the display; and at 211—displaying, by the processor, the second window in the second basket, wherein the size of the second window is limited to the size of the second basket such that the second window is incapable of being made to fill the entire display area of the display.

Figure 3:
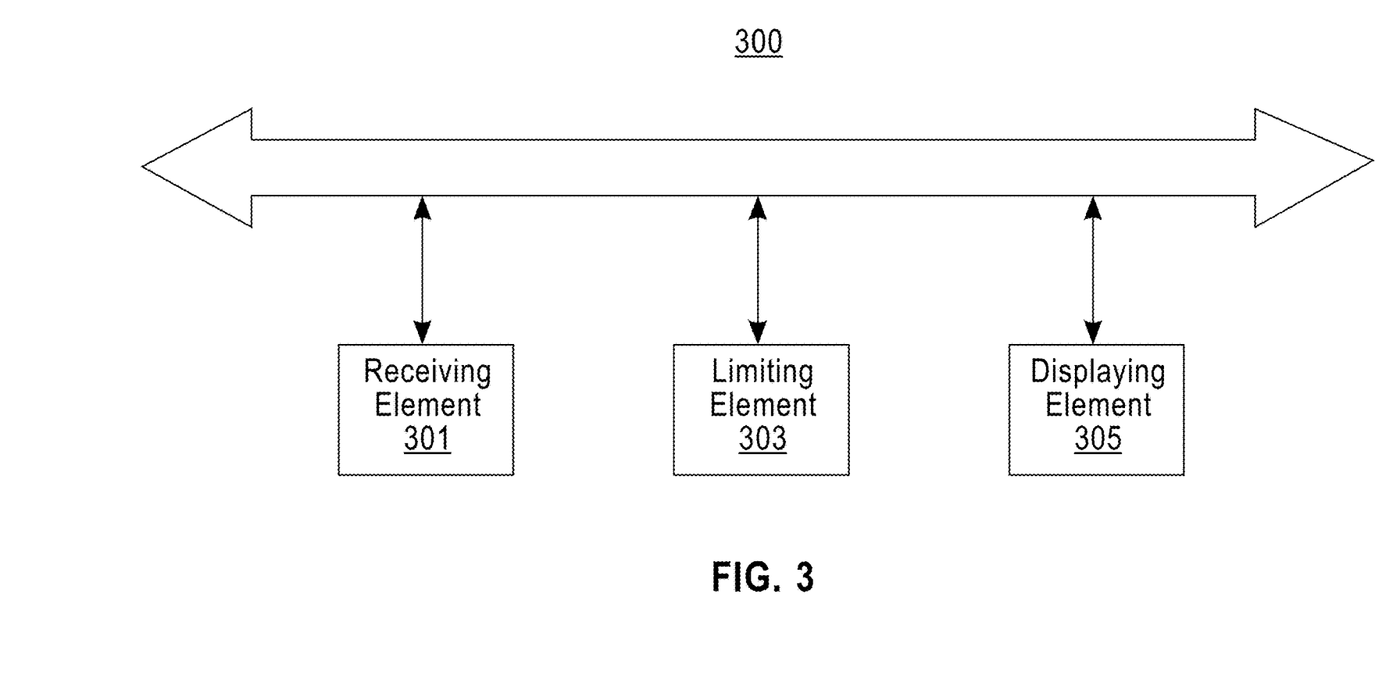
FIG. 3 depicts a block diagram of a system according to an embodiment.

Referring now to FIG. 3, in another embodiment, a system 300 for management of a display is provided. This system may include a processor (not shown); and a memory (not shown) storing computer readable instructions that, when executed by the processor, implement: a receiving element 301 configured to receive: (a) an indication from a user of a first location on the display for a first basket associated with at least a first window; and (b) an indication from the user of a second location on the display for a second basket associated with at least a second window; a limiting element 303 configured to limit: (a) a size of the first basket to be smaller than a size of a display area of the display; and (b) a size of the second basket to be smaller than the size of the display area of the display; and a displaying 305 element configured to display: (a) the first window in the first basket, wherein the size of the first window is limited to the size of the first basket such that the first window is incapable of being made to fill the entire display area of the display; and (b) the second window in the second basket, wherein the size of the second window is limited to the size of the second basket such that the second window is incapable of being made to fill the entire display area of the display.

In one example, communication between and among the various components of FIG. 3 may be bi-directional. In another example, the communication may be carried out via the Internet, an intranet, a local area network, a wide area network and/or any other desired communication channel(s). In another example, each of the components may be operatively connected to each of the other components. In another example, some or all of these components may be implemented in a computer system of the type shown in FIG. 6.

Reference will now be made to an example providing additional details with respect to how a window size is limited to be within a basket. More particularly, in this example, when window A is placed into basket N (bounded by coordinates x1,y1 and x2,y2), then window A is treated as being on a separate screen that is the size of the basket. Specifically, in this example: maximizing window A will have it take the entire x1,y1 to x2,y2 area; placing window A in "full screen" mode will have it take the entire x1,y1 to x2,y2 area without any window borders, title bar, or other window features; window A will be "clipped" at those boundaries, so if an attempt is made to draw part of the window outside those boundaries, the portion of the window outside the x1,y1 to x2,y2 area will not be displayed; if the program attempts to position window A at absolute coordinates (such as the upper left corner being at a1,b1), then the window will actually be displayed inside the basket area with its upper left corner at x1+a1,y1+b1.

Figure 4A:
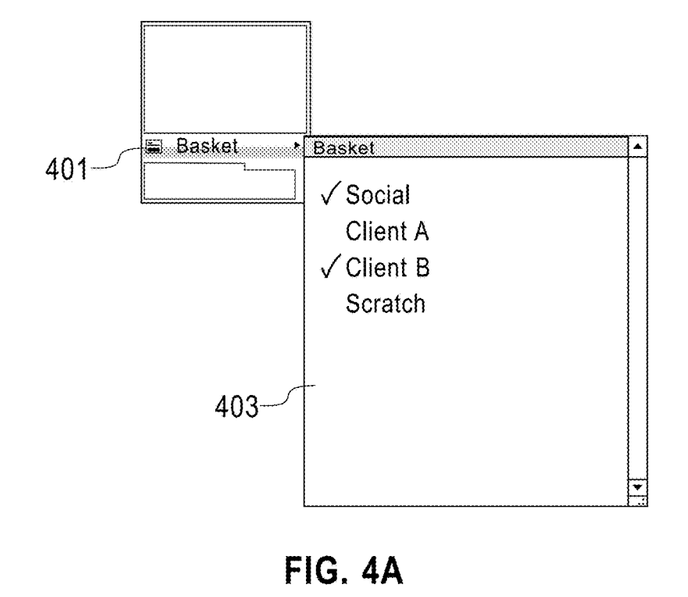
FIGS. 4A and 4B depict example display diagrams with respect to opening a document and placing the document into two baskets according to an embodiment.
Figure 4B:
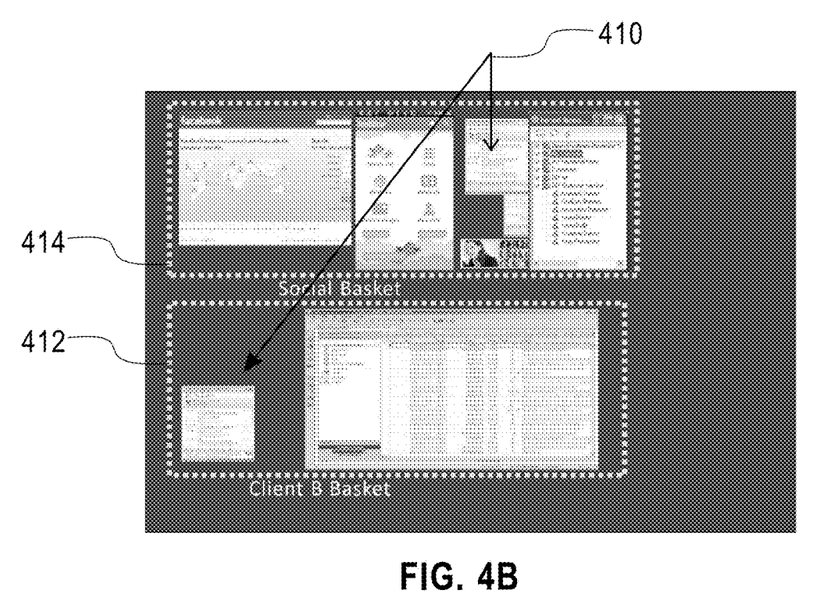

Referring now to FIGS. 4A and 4B, depicted are example display diagrams with respect to opening a document and placing the document into two baskets according to an embodiment. More particularly, as seen in this example, when the user right-clicks the window title bar (see call-out number 401 of FIG. 4A), the user is presented with a graphical user interface (GUI) element (see call-out number 403 of FIG. 4A) via which the user may select in which basket(s) the window should appear. Further, as seen in FIG. 4B, based upon the actions taken in FIG. 4A, the window 410 appears in both of baskets 412 and 414. In one specific example, each window 410 may be moved independently inside its respective basket, but the window 410 displays the same information inside each basket.

Figure 5:
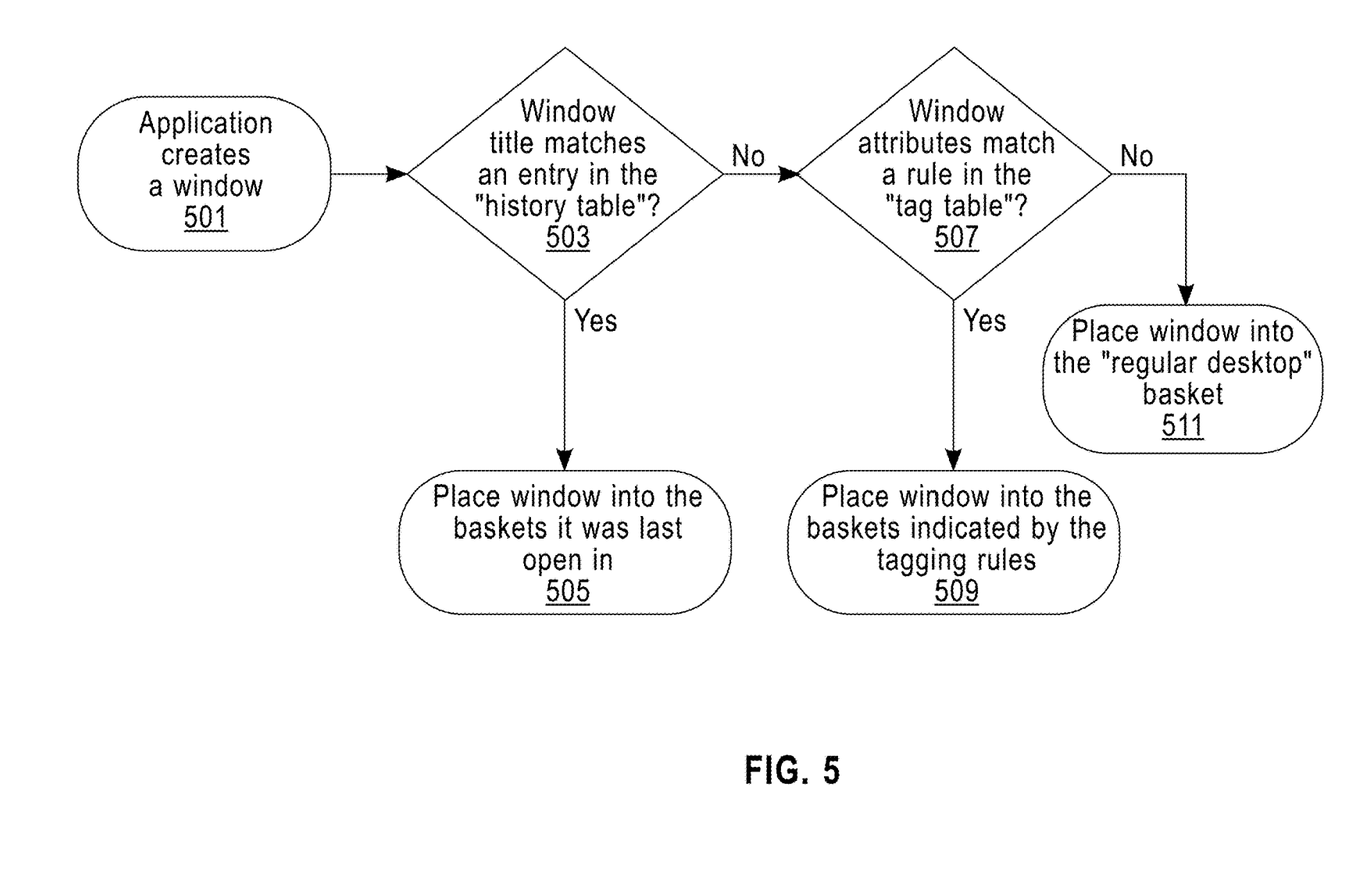
FIG. 5 depicts a flowchart of a method according to an embodiment.

Referring now to FIG. 5, depicted is a flowchart of a method according to an embodiment. More particularly, at step 501, an application creates a window. Then, at step 503 a determination is made whether the window title (of the created window) matches an entry in a "history table". If so, then at step 505 the created window is placed into the basket(s) it was last open in. If not, then at step 507 a determination is made whether the window attributes (of the created window) match a rule in a "tag table". If so, then at step 509 the created window is placed into the basket(s) indicated by the tagging rules. If not, then at step 511 the created window is placed into the "regular desktop" basket.

Figure 6:
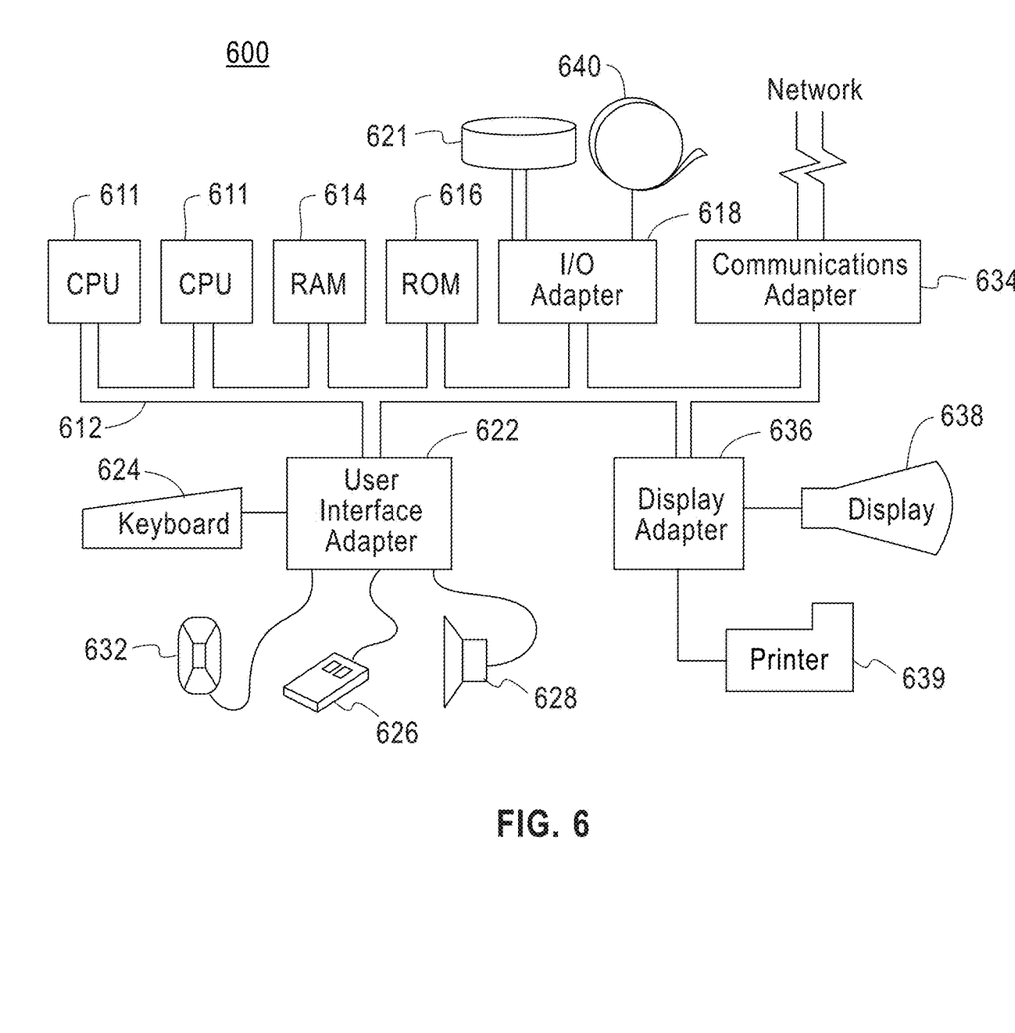
FIG. 6 depicts a block diagram of a system according to an embodiment.

Referring now to FIG. 6, this figure shows a hardware configuration of computing system 600 according to an embodiment of the present invention. As seen, this hardware configuration has at least one processor or central processing unit (CPU) 611. The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communications adapter 634 for connecting the system 600 to a data processing network, the Internet, an Intranet, a local area network (LAN), etc., and a display adapter 636 for connecting the bus 612 to a display device 638 and/or printer 639 (e.g., a digital printer or the like).

As described herein, various embodiments may be used in the context of windowing, desktop video and displays, workstation video and displays, HDTV, user interfaces, input and output technologies and system software.

In one embodiment, a computer-implemented method for management of a display is provided, the method comprising: receiving, by a processor, an indication from a user of a first location on the display for a first basket associated with at least a first window; receiving, by the processor, an indication from the user of a second location on the display for a second basket associated with at least a second window; limiting, by the processor, a size of the first basket to be smaller than a size of a display area of the display; limiting, by the processor, a size of the second basket to be smaller than the size of the display area of the display; displaying, by the processor, the first window in the first basket, wherein the size of the first window is limited to the size of the first basket such that the first window is incapable of being made to fill the entire display area of the display; and displaying, by the processor, the second window in the second basket, wherein the size of the second window is limited to the size of the second basket such that the second window is incapable of being made to fill the entire display area of the display.

In one example, the display comprises one of: (a) a single screen; and (b) multiple screens In another example, the method further comprises: receiving, by the processor, an indication from the user of a size of the first basket at the first location; and receiving, by the processor, an indication from the user of a size of the second basket at the second location.

In another example, the indications are received from the user via input from at least one of a mouse and a trackball.

In another example: the received indications are stored in a memory; and the received indications are retrieved from the memory to display the first and second baskets.

In another example, one of: (a) the first basket and the second basket at least partially overlap; and (b) the first basket and the second basket do not overlap.

In another embodiment, a computer readable storage medium, tangibly embodying a program of instructions executable by the computer for management of a display is provided, the program of instructions, when executing, performing the following steps: receiving an indication from a user of a first location on the display for a first basket associated with at least a first window; receiving an indication from the user of a second location on the display for a second basket associated with at least a second window; limiting a size of the first basket to be smaller than a size of a display area of the display; limiting a size of the second basket to be smaller than the size of the display area of the display; displaying the first window in the first basket, wherein the size of the first window is limited to the size of the first basket such that the first window is incapable of being made to fill the entire display area of the display; and displaying the second window in the second basket, wherein the size of the second window is limited to the size of the second basket such that the second window is incapable of being made to fill the entire display area of the display.

In one example, the display comprises one of: (a) a single screen; and (b) multiple screens.

In another example, the program of instructions, when executing, further performs the following steps: receiving an indication from the user of a size of the first basket at the first location; and receiving an indication from the user of a size of the second basket at the second location.

In another example, the indications are received from the user via input from at least one of a mouse and a trackball.

In another example: the received indications are stored in a memory; and the received indications are retrieved from the memory to display the first and second baskets.

In another example, one of: (a) the first basket and the second basket at least partially overlap; and (b) the first basket and the second basket do not overlap.

In another embodiment, a computer-implemented system for management of a display is provided, the system comprising: a processor; and an instruction memory storing computer readable instructions that, when executed by the processor, implement: a receiving element configured to receive: (a) an indication from a user of a first location on the display for a first basket associated with at least a first window; and (b) an indication from the user of a second location on the display for a second basket associated with at least a second window; a limiting element configured to limit: (a) a size of the first basket to be smaller than a size of a display area of the display; and (b) a size of the second basket to be smaller than the size of the display area of the display; a displaying element configured to display: (a) the first window in the first basket, wherein the size of the first window is limited to the size of the first basket such that the first window is incapable of being made to fill the entire display area of the display; and (b) the second window in the second basket, wherein the size of the second window is limited to the size of the second basket such that the second window is incapable of being made to fill the entire display area of the display.

In one example, the display comprises one of: (a) a single screen; and (b) multiple screens.

In another example, the receiving element is further configured to: receive an indication from the user of a size of the first basket at the first location; and receive an indication from the user of a size of the second basket at the second location.

In another example, the indications are received from the user via input from at least one of a mouse and a trackball.

In another example: the received indications are stored in a basket memory; and the received indications are retrieved from the basket memory to display the first and second baskets.

In another example, one of: (a) the first basket and the second basket at least partially overlap; and (b) the first basket and the second basket do not overlap.

In another example, the instruction memory and the basket memory are distinct memories.

In another example, the instruction memory and the basket memory are a single memory.

In other examples, any steps described herein may be carried out in any appropriate desired order.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for management of a display, the method comprising:

receiving, by a processor, an indication from a user of a first location on the display for a first basket, wherein the first basket is a first region on the display designated to display a first set of windows by default, and the first set of windows is associated with a first tag;

receiving, by the processor, an indication from the user of a second location on the display for a second basket, wherein the second basket is a second region on the display designated to display a second set of windows by default, and the second set of windows is associated with a second tag;

limiting, by the processor, a size of the first basket to be smaller than a size of a display area of the display;

limiting, by the processor, a size of the second basket to be smaller than the size of the display area of the display;

limiting, by the processor, a size of a first window associated with the first tag to the size of the first basket by modifying a first setting of the first window to open the first window in a separate screen that is the size of the first basket instead of opening the first window in the display;

limiting, by the processor, a size of a second window associated with the second tag to the size of the second basket by modifying a second setting of the second window to open the second window in a separate screen that is the size of the second basket instead of opening the second window in the display;

displaying, by the processor, the first window associated with the first tag in the first basket, wherein the first window is incapable of being made to fill the entire display area of the display, the first window can be moved independently inside the first basket, and portions of the first window are prevented from being displayed outside of boundaries of the first basket;

displaying, by the processor, the second window associated with the second tag in the second basket, wherein the second window is incapable of being made to fill the entire display area of the display, the second window can be moved independently inside the second basket, and portions of the second window are prevented from being displayed outside of boundaries of the second basket;

retaining, by the processor, the first setting to display the first window in the first basket by default in a subsequent instance where the first window is requested to be displayed;

retaining, by the processor, the second setting to display the second window in the second basket by default in a subsequent instance where the second window is requested to be displayed; and wherein when the first window is also associated with the second tag, limiting the size of the first window comprises limiting a size of a copy of the first window to the size of the second basket, displaying the first window includes displaying the copy of the first window in the second basket, and wherein the first window and the copy of the first window can be moved independently within the first basket and the second basket respectively.

2. The method of claim 1, wherein the display comprises one of: (a) a single screen; and (b) multiple screens.

3. The method of claim 1, further comprising:
receiving, by the processor, an indication from the user of a size of the first basket at the first location; and
receiving, by the processor, an indication from the user of a size of the second basket at the second location.

4. The method of claim 3, wherein the indications are received from the user via input from at least one of a mouse and a trackball.

5. The method of claim 3, wherein:
the received indications are stored in a memory; and
the received indications are retrieved from the memory to display the first and second baskets.

6. The method of claim 1, wherein one of:
(a) the first basket and the second basket at least partially overlap; and
(b) the first basket and the second basket do not overlap.

7. A computer readable storage medium, tangibly embodying a program of instructions executable by the computer for management of a display, the program of instructions, when executing, performing the following steps: receiving an indication from a user of a first location on the display for a first basket, wherein the first basket is a first region on the display designated to display a first set of windows by default, and the first set of windows is associated with a first tag; receiving an indication from the user of a second location on the display for a second basket, wherein the second basket is a second region on the display designated to display a second set of windows by default, and the second set of windows is associated with a second tag; limiting a size of the first basket to be smaller than a size of a display area of the display; limiting a size of the second basket to be smaller than the size of the display area of the display; limiting a size of a first window associated with the first tag to the size of the first basket by modifying a first setting of the first window to open the first window in a separate screen that is the size of the first basket instead of opening the first window in the display; limiting a size of a second window associated with the second tag to the size of the second basket by modifying a second setting of the second window to open the second window in a separate screen that is the size of the second basket instead of opening the second window in the display; displaying the first window associated with the first tag in the first basket, wherein the first window is incapable of being made to fill the entire display area of the display, the first window can be moved independently inside the first basket, and portions of the first window are prevented from being displayed outside of boundaries of the first basket; displaying the second window associated with the second tag in the second basket, wherein the second window is incapable of being made to fill the entire display area of the display, the second window can be moved independently inside the second basket, and portions of the second window are prevented from being displayed outside of boundaries of the second basket; retain the first setting to display the first window in the first basket by default in a subsequent instance where the first window is requested to be displayed; retain the second setting to display the second window in the second basket by default in a subsequent instance where the second window is requested to be displayed; and wherein when the first window is also associated with the second tag, limiting the size of the first window comprises limiting a size of a copy of the first window to the size of the second basket, the display of the first window includes a display of the copy of the first window in the second basket, and wherein the first window and the copy of the first window can be moved independently within the first basket and the second basket respectively.

8. The computer readable storage medium of claim 7, wherein the display comprises one of: (a) a single screen; and (b) multiple screens.

9. The computer readable storage medium of claim 7, wherein the program of instructions, when executing, further performs the following steps:
receiving an indication from the user of a size of the first basket at the first location; and
receiving an indication from the user of a size of the second basket at the second location.

10. The computer readable storage medium of claim 9, wherein the indications are received from the user via input from at least one of a mouse and a trackball.

11. The computer readable storage medium of claim 9, wherein:
the received indications are stored in a memory; and
the received indications are retrieved from the memory to display the first and second baskets.

12. The computer readable storage medium of claim 7, wherein one of:
(a) the first basket and the second basket at least partially overlap; and
(b) the first basket and the second basket do not overlap.

13. A computer-implemented system for management of a display, the system comprising: a processor; and an instruction memory storing computer readable instructions that, when executed by the processor, implement: a receiving element configured to receive: (a) an indication from a user of a first location on the display for a first basket, wherein the first basket is a first region on the display designated to display a first set of windows by default, and the first set of windows is associated with a first tag; and (b) an indication from the user of a second location on the display for a second basket, wherein the second basket is a second region on the display designated to display a second set of windows by default, and the second set of windows is associated with a second tag; a limiting element configured to limit: (a) a size of the first basket to be smaller than a size of a display area of the display; (b) a size of the second basket to be smaller than the size of the display area of the display; (c) a size of a first window associated with the first tag to the size of the first basket by modifying a first setting of the first window to open the first window in a separate screen that is the size of the first basket instead of opening the first window in the display; and (d) a size of a second window associated with the second tag to the size of the second basket by modifying a second setting of the second window to open the second window in a separate screen that is the size of the second basket instead of opening the second window in the display; a displaying element configured to display: (a) the first window associated with the first tag in the first basket, wherein the first window is incapable of being made to fill the entire display area of the display, the first window can be moved independently inside the first basket, and portions of the first window are prevented from being displayed outside of boundaries of the first basket; and (b) the second window associated with the second tag in the second basket, wherein the second window is incapable of being made to fill the entire display area of the display, the second window can be moved independently inside the second basket, and portions of the second window are prevented from being displayed outside of boundaries of the second basket; wherein the processor is configured to: retain the first setting to display the first window in the first basket by default in a subsequent instance where the first window is requested to be displayed; retain the second setting to display the second window in the second basket by default in a subsequent instance where the second window is requested to be displayed; and wherein when the first window is also associated with the second tag, the limit of the size of the first window comprises a limit of a size of a copy of the first window to the size of the second basket, the display of the first window includes a display of the copy of the first window in the second basket, and wherein the first window and the copy of the first window can be moved independently within the first basket and the second basket respectively.

14. The system of claim 13, wherein the display comprises one of: (a) a single screen; and (b) multiple screens.

15. The system of claim 13, wherein the receiving element is further configured to:

receive an indication from the user of a size of the first basket at the first location; and receive an indication from the user of a size of the second basket at the second location.

16. The system of claim 15, wherein the indications are received from the user via input from at least one of a mouse and a trackball.

17. The system of claim 15, wherein:

the received indications are stored in a basket memory; and the received indications are retrieved from the basket memory to display the first and second baskets.

18. The system of claim 13, wherein one of:

(a) the first basket and the second basket at least partially overlap; and (b) the first basket and the second basket do not overlap.

19. The system of claim 17, wherein the instruction memory and the basket memory are distinct memories.

20. The system of claim 17, wherein the instruction memory and the basket memory are a single memory.

* * * * *